United States Patent Office 3,328,351
Patented June 27, 1967

3,328,351
POLY(1,3-OXOAZO-2,4-DIONE/URETHANES)
AND THEIR PREPARATION
Rudolph J. Angelo, Wilmington, Del., assignor to E. I. du Pont de Nemours and Company, Wilmington, Del., a corporation of Delaware
No Drawing. Filed Mar. 4, 1963, Ser. No. 262,386
12 Claims. (Cl. 260—47)

This invention relates to a novel class of polymers and a process for preparing them.

The novel class of polymers are poly (1,3-oxaza-2,4-dione/urethanes) hereinafter called poly (oxazadione/urethanes). These polymers are exteremely stable at high temperatures and are inert to most solvents at all temperatures. In the form of shaped articles, e.g. films, fibers, rods, tubes, etc., they are substantially colorless, flexible, strong and, in short, have a multitude of desirable properties. Their stability, although a very desirable characteristic in many end uses, makes these polymers very difficult to form into shaped articles. For example, they cannot be melt extruded easily because of their thermal stability as characterized by their high melting points.

One object of this invention is to overcome this particular shortcoming and provide a process for producing shaped articles of the poly (oxazadione/urethanes). The process that has been discovered involves first forming a shapeable intermediate, then shaping the intermediate into a useful articles and, thereafter, converting the intermediate in the form of the shaped article into the stable polymer containing the oxazadione rings.

Specifically, the process involves first forming a polyurethane of a dihydroxy, monobasic ester of an organic acid by the reaction of at least one diisocyanate and at least one dihydroxy compound, the latter having one esterified carboxyl group ortho to a hydroxyl group when the starting acid is aromatic and being attached to a carbon atom to which a hydroxyl group is also attached when the acid is aliphatic, i.e. as close as possible in accordance with the structural limitations of the compound. In the next step, the polyurethane is shaped into a useful article, e.g. by casting a film or extruding filaments through a spinneret. Thereafter, the polyurethane in the form of the shaped article may be heated so that it converts to the corresponding poly (oxazadione/urethane) by the elimination of one molecule of alcohol per oxazadione ring.

The final cyclized products, the poly (oxazadione/urethane), are of the following general formula:

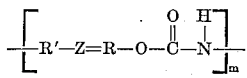

wherein:
R' is arylene or alkylene,
R is a trivalent organic radical of at least 2 carbon atoms, and
Z is the radical

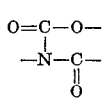

wherein the valences from O and C are attached to R and are attached to adjacent carbon atoms of an aromatic ring when R is aromatic and are attached to the same carbon atom when R is aliphatic and wherein $m$ is an integer sufficiently high to provide a film-forming polymer.

The starting materials in the process are dihydroxy, monobasic acids and diisocyanates. The acids are characterized by having the carboxyl group ortho to a hydroxyl group when the acid is aromatic and having a pair of carboxyl and hydroxyl groups attached to the same carbon atom when the acid is aliphatic. In the process, the carboxyl group of the dihydroxy, monobasic acid is blocked by esterification in the conventional manner, e.g. with an alcohol, an organic halide in alkaline medium, boron trifluoride and isobutylene, diazomethane, etc., preparatory to reaction with the diisocyanate to form the polyurethane.

The dihydroxy, monobasic acids useful in the present invention include: 2,4-dihydroxy benzoic acid; 3-carboxy-4,4'-dihydroxy biphenyl; 3-carboxy-4,4'-dihydroxy diphenyl methane; 1,4-dihydroxy-2-naphthoic acid; 1,5-dihydroxy-2-naphthoic acid; glyceric acid; 3,3'-dihydroxy-4-carboxy diphenyl methane; 3,3'-dihydroxy-4-carboxy biphenyl; 3-carboxy-4,4'-dihydroxy diphenyl ether; 3,3'-dihydroxy-4-carboxy diphenyl ether; 3-carboxy-4,4'-dihydroxy diphenyl sulfide; 3,3'-dihydroxy-4-carboxy diphenyl sulfide; 3-carboxy-4,4'-dihydroxy diphenyl sulfone; 3,3'-dihydroxy-4-carboxy diphenyl sulfone; α,β-dihydroxy butyric acid; α,γ-dihydroxy butyric acid; α,γ-dihydroxy valeric acid; and 1,4-dihydroxyhexahydrobenzoic acid.

The diisocyanates useful in the present invention are those having the following structural formula:

$$O=C=N-R'-N=C=O$$

wherein R' is a divalent organic radical (aromatic, aliphatic, cycloaliphatic, heterocyclic, bridged aromatic or substituted derivatives thereof, etc.), preferably an aromatic radical selected from the group consisting of phenylene, naphthylene, biphenylene, anthrylene, furylene, benzfurylene and

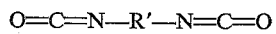

wherein $R^2$ is selected from the group consisting of alkylene of 1–4 carbon atoms,

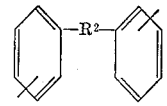

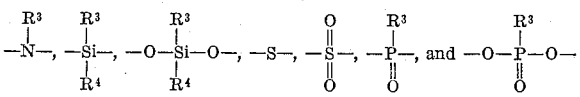

where $R^3$ and $R^4$ are alkyl or aryl.

Among the diisocyanates which are suitable for use in the present invention are:

meta-phenylene diisocyanate;
para-phenylene diisocyanate;
2,4-toluene diisocyanate;
4,4'-dimethoxy-3,3'-diisocyanatobiphenyl;
3,3'-dimethoxy-4,4'-diisocyanatobiphenyl;
4-chloro-1,3-phenylene diisocyanate;
1,5-naphthylene diisocyanate;
2,6-naphthylene diisocyanate, bis(4-isocyanatophenyl) methane;
bis(4-isocyanatophenyl) ethane;
cumene-2,4-diisocyanate;
4-methoxy-1,3-phenylene diisocyanate;
4-phenoxy-1,3-phenylene diisocyanate;
4-ethoxy-1,3-phenylene diisocyanate;
2,4'-diisocyanato diphenyl ether;
4,4'-diisocyanato diphenyl ether;
5,6-dimethyl-1,3-phenylene diisocyanate;
2,4-dimethyl-1,3-phenylene diisocyanate;
benzidine diisocyanate; (4,4'-diisocyanato diphenyl);
4,6-dimethyl-1,3-phenylene diisocyanate;
1,4-anthracene diisocyanate;
9,10-anthrecene diisocyanate;
3,3'-dimethyl-4,4'-diisocyanato diphenyl;
2,5-fluorene diisocyanate;

1,4-diisocyantocyclohexane;
hexamethylene diisocyanate;
decamethylene diisocyanate, trimethylene diisocyanate;
dodecamethylene diisocyanate and
2,6-diisocyanato benzfurane.

It should be noted that in the preferred diisocyanates, the two isocyanate groups are attached directly to an aromatic ring and may be attached either to the same ring or to different rings.

The first step in the process involves the preparation of a polyurethane by the reaction of at least one diisocyanate with at least one dihydroxy, monobasic ester of an organic acid, preferably of an aromatic acid. The esters, prepared from the acids by conventional methods, i.e. reaction with an alcohol of the formula $R^5OH$ wherein $R^5$ is lower alkyl or aryl, have a carboalkoxy or carboaryloxy substituent ortho or alpha to a hydroxyl group. Such esters are usually of the carbomethoxy, carboethoxy, carbobutoxy, and carbopropoxy variety.

Reaction is generally obtained by first dissolving the diisocyanate and the dihydroxy compound in an inert solvent, e.g. N-methyl pyrrolidone, dioxane, monochlorobenzene, toluene, dimethylformamide, dimethylacetamide, dimethylsulfoxide, tetramethylene sulfone, carbon tetrachloride, acetone, methyl ethyl ketone, methyl isobutyl ketone, etc. A basic catalyst, usually a tertiary amine e.g. triethylamine, trimethylamine, triisopropylamine, tri-n-butylamine, pyridine, quinoline, isoquinoline, N,N-dimethylaniline, etc. is added and the mixture is heated at a temperature of 25–150° C., the temperature being at or near the refluxing temperature of the solvent for a time sufficient to produce a polymer. This time is usually 0.5–3 hours but may be more or less depending upon the desired degree of polymerization.

The intermediate polyurethane may be represented by the following formula:

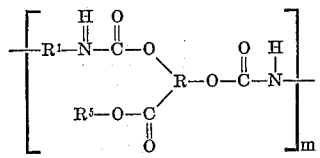

wherein R is a trivalent organic radical of at least 2 carbon atoms; $R^1$ is arylene or alkylene and includes the specific radicals shown for the diisocyanates; $R^5$ is lower alkyl (1–5 carbon atoms) or aryl.

After forming the polyurethane, the polymer may be cast or extruded as films, filaments, rods, tubes, etc. The shaped article obtained is then heated to a temperature of at least 200° C. but below the degradation temperature of the final polymer, preferably in a vacuum or inert atmosphere, for a time sufficient to cyclize the polyurethane to the poly(oxazadione/urethane). It should be understood that the intermediate polymer for shaping need not be composed completely of polyurethane. Some of the cyclic product may be present. However, the intermediate polymeric composition must contain sufficient polyurethane to be shapeable. The time required for cyclizing will depend upon the particular polyurethane and the amount of the polyurethane present in the intermediate composition and will vary from a few minutes to an hour or more.

It should be understood that the sulfur analogs may be substituted for the dihydroxy compounds and/or the diisocyanates in the process of this invention. In this manner, a thiodihydroxy benzoic acid ester and/or a diisothiocyanate may be substituted for all or part of the dihydroxy monocarboxylic acid ester and/or diisocyanate to prepare the intermediate that eventually leads to a poly(oxazadione/urethane) having one or more oxygen atoms replaced by sulfur atoms.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques[1] known to those skilled in the art. The majority of the infrared spectra herein were taken on pressed films by the use of a Perkin-Elmer model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

*Example 1*

The methyl ester of 2,4-dihydroxy benzoic acid is prepared by reacting 154 g. (1.0 M) of 2,4-dihydroxy benzoic acid with 500 ml. of dry methanol in 500 ml. of dry benzene and 10 ml. of concentrated sulfuric acid. The mixture is refluxed for 3 days during which time an attempt is made to remove the water formed by the esterification reaction. However, no water layer is formed in the separator. Most of the solvent is stripped off and excess water is added. A white precipitate is obtained and washed several times with water. The remainder is a yellow oil which is treated with hot water and sodium bicarbonate until no further frothing is noted. The oil is separated and upon cooling yields a solid. The solid is recrystallized twice from an ethanol/water mixture to yield 20 g. of the methyl ester of 2,4-dihydroxy benzoic acid in the form of a white powder melting at 124° C.

The polyurethane of the methyl ester of 2,4-dihydroxy benzoic acid and 2,4-toluene diisocyanate is prepared in the following manner. One and seventy-four hundredths grams (0.01 M) of freshly distilled 2,4-toluene diisocyanate is added to 1.68 g. (0.01 M) of the methyl ester of 2,4-dihydroxy benzoic acid in 10 ml. of N-methyl pyrrolidone. Three drops of triethylamine are added and the temperature rises from 25 to 40° C. With the development of a yellow color. The solution is stirred and heated at 90–100° C. for 3 hours. Casting on a glass plate, followed by solvent evaporation, leaves a clear, colorless film. The infrared spectrum of the film indicates the orthocarbomethoxy polyurethane structure with strong N—H and $CH_3$ absorptions at 3.0 and 3.45 and carbonyl absorptions at 5.6–6.0, characteristic of ester and urethane links.

The polymer solution is also cast on polished steel plates and solvent is removed at 120° C. to obtain films. These films are heated in a vacuum oven at 200° C. for 30 minutes, and at 300° C. for 15 minutes. At 200° C., the films are yellow and brittle without any significant change of the polyurethane infrared spectrum. At 300° C., a yellow film is obtained that is tough and flexible. The infrared spectrum shows significant changes characteristic of the benzoxazinedione structure. The N—H absorption of 3.0 is diminished. The $CH_3$ absorption (from the methyl ester) at 3.45 has practically disappeared and the carbonyl absorptions 5.6–6.0 has sharpened with some splitting. These signify a poly benzoxazinedione/polyurethane structure.

*Example 2*

Substitution of 1.5-dihydroxy-2-napthoic acid for 2,4-dihydroxy benzoic acid in the procedure of Example 1

---

[1] W. M. D. Bryant and R. C. Voter, Journal of American Chemical Society, 75, 6113 (1953); and F. W. Billmeyer, "Textbook of Polymer Chemistry," chapter 7, Interscience Publishers 1957.

leads to the corresponding poly (naphoxazinedione/urethane).

Example 3

When the methyl ester of 3-carboxy-4,4'-dihydroxy biphenyl is substituted for the methyl ester of 2,4-dihydroxy benzoic acid in Example 1, the corresponding polyarylurethane is produced. This polymer is cast into film and then converted to the corresponding poly (benzoxazine-2,4-dione/urethane) by heating at 300° C. for 30 minutes. A tough, flexible film is produced.

Examples 4–9

Example 1 is repeated, substituting each of the following diisocyanates for 2,4-toluene diisocyanate: m-phenylene diisocyanate; 4,4'-dimethoxy-3,3'-diisocyanatobiphenyl; 4-chloro-1,3-phenylene diisocyanate; 4,4'-biphenylene diisocyanate; 4,4'-diisocyanato diphenyl ether; and 1,5-naphthylene diisocyanate. The product in each case is a tough, flexible film of the corresponding poly (benzoxazine-2,4 - dione/urethane) or poly (naphthoxazine-2,4-dione/urethane).

The poly (oxazadione/urethane) of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors in the preferred processes of preparation, these polymer precursors may be processed into shaped articles such as films, fibers, tubes, rods, sheets and discs by conventional techniques, and then converted into the final high-melting, relatively intractable cyclized polymer, the poly (oxazadione/urethane).

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in an extensive variety of wrapping, packaging and bundling applications. Additionally, the film-forming polymer may be used in automobile and aviation interior head lining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

What is claimed is:

1. Poly (1,3-oxaza - 2,4 - dione/urethane) having the structural formula:

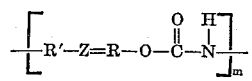

where:
  R' is a divalent organic radical selected from the group consisting of phenylene, naphthylene, biphenylene, anthrylene, furylene, benzfurylene, fluorenylidene, alkylene of 3 through 12 carbons and

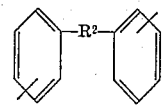

wherein $R^2$ is selected from the group consisting of alkylene of 1–4 carbon atoms, —O—,

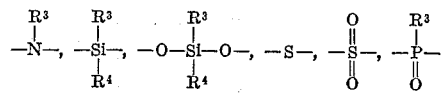

and

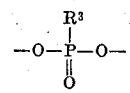

where $R^3$ and $R^4$ are selected from the group consisting of alkyl and aryl, said divalent organic radical when other than alkylene being further selected from the group consisting of substituted aromatic R' radicals wherein the substituents are attached directly to an aromatic ring and are selected from the group consisting of 1–2 alkyl radicals of 1–3 carbons each, 1–2 alkoxy radicals of 1–2 carbons each, phenoxy and chloro;

R is a trivalent organic radical selected from the group consisting of aliphatic radicals of 2–6 carbons, trivalent benzene, trivalent naphthalene, and trivalent bridged bicyclic radicals where each cyclic group at each end of the bridge has 6 carbon atoms and the bridge is selected from the group consisting of a carbon-to-carbon bond, methylene, oxygen, sulfur and sulfone;

Z is the radical

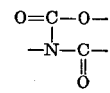

the valances from O and C being attached to R, to adjacent carbon atoms of an aromatic ring when R is aromatic and to the same carbon atom when R is aliphatic; and m is an integer sufficient to provide an inherent viscosity of at least 0.1 as measured at 30° C. as an 0.5% by weight solution in sulfuric acid.

2. Poly (1,3-oxaza-2,4-dione/urethane) as in claim 1 wherein R' is

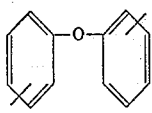

3. Poly (1,3-oxaza-2,4-dione/urethane) as in claim 1 wherein R' is phenylene.
4. Poly (1,3-oxaza-2,4-dione/urethane) as in claim 1 wherein R' is toluylene.
5. Poly (1,3-oxaza-2,4-dione/urethane) as in claim 1 wherein R' is biphenylene.
6. Poly (1,3-oxaza-2,4-dione/urethane) as in claim 1 wherein R is

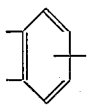

7. Poly (1,3-oxaza-2,4-dione/urethane) as in claim 1 wherein R is

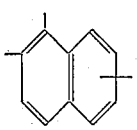

8. Poly (1,3-oxaza-2,4-dione/urethane) as in claim 1 wherein R is

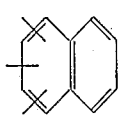

9. Poly (1,3-oxaza-2,4-dione/urethane) as in claim 1 wherein R is

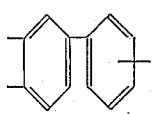

10. A polyurethane having the structural formula:

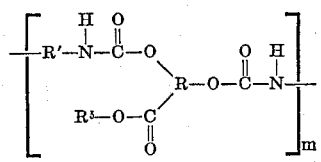

where:
R' is a divalent organic radical selected from the group consisting of phenylene, naphthylene, biphenylene, anthrylene, furylene, benzfurylene, fluoroenylidene, alkylene of 3 through 12 carbons and

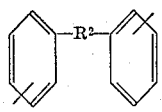

wherein $R^2$ is selected from the group consisting of alkylene of 1–4 carbon atoms,

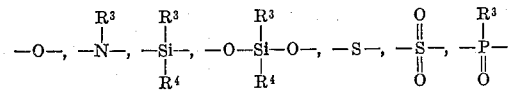

and

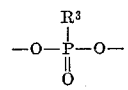

where $R^3$ and $R^4$ are selected from the group consisting of alkyl and aryl, said divalent organic radical when other than alkylene being further selected from the group consisting of substituted aromatic R' radicals wherein the substituents are attached directly to an aromatic ring and are selected from the group consisting of 1–2 alkyl radicals of 1–3 carbons each, 1–2 alkoxy radicals of 1–2 carbons each, phenoxy and chloro;

R is a trivalent organic radical selected from the group consisting of aliphatic radicals of 2–6 carbons, trivalent benzene, trivalent naphthalene, and trivalent bridged bicyclic radicals where each cyclic group at each end of the bridge has 6 carbon atoms and the bridge is selected from the group consisting of a carbon-to-carbon bond, methylene, oxygen, sulfur and sulfone;

$R^5$ is selected from the group consisting of alkyl of 1–5 carbons and aryl; and $m$ is an integer sufficient to provide an inherent viscosity of at least 0.1 as measured at 30° C. as an 0.5% by weight solution in sulfuric acid.

11. A composition of the polyurethane of claim 10 and a solvent therefor.

12. A process for preparing shaped articles of poly(1,3-oxaza-2,4-dione/urethanes) which comprises heating a diisocyanate with a dihydroxy, monobasic ester of an organic acid, the carbonyl group of said dihydroxy, monobasic ester being ortho to a hydroxyl group when said dihydroxy, monobasic ester is aromatic and the carbonyl group of said dihydroxy, monobasic ester being attached to a carbon atom to which a hydroxyl group is also attached when said dihydroxy, monobasic ester is aliphatic, in an inert solvent, in the presence of a basic catalyst, at a temperature in the range of 25–150° C. for a time sufficient to form a composition containing polyurethane; forming said polyurethane-containing composition into a shaped article; and heating said article at a temperature of at least 200° C. but below the degradation temperature of the corresponding poly(1,3-oxaza-2,4-dione/urethane) for a time sufficient to cyclize said polyurethane into said corresponding poly(1,3-oxaza-2,4-dione/urethane).

No references cited.

WILLIAM H. SHORT, *Primary Examiner.*

C. A. WENDEL, H. D. ANDERSON,
*Assistant Examiners.*